United States Patent
Eberlein et al.

(10) Patent No.: US 9,740,476 B2
(45) Date of Patent: Aug. 22, 2017

(54) VERSION CONTROL FOR CUSTOMIZED APPLICATIONS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/967,443

(22) Filed: Dec. 14, 2015

(65) Prior Publication Data
US 2017/0168801 A1   Jun. 15, 2017

(51) Int. Cl.
*G06F 9/44*    (2006.01)
*G06F 9/445*   (2006.01)
*H04L 29/08*   (2006.01)

(52) U.S. Cl.
CPC .............. *G06F 8/65* (2013.01); *H04L 67/06* (2013.01)

(58) Field of Classification Search
CPC .............. G06F 8/71; G06F 8/65; H04L 67/06
See application file for complete search history.

(56) References Cited

U.S. PATENT DOCUMENTS

| | | | | |
|---|---|---|---|---|
| 7,093,232 | B1 * | 8/2006 | Chatzigianis | G06F 8/71 717/122 |
| 9,003,365 | B1 * | 4/2015 | Vogelheim | G06F 9/46 717/120 |
| 2003/0158919 | A1 * | 8/2003 | Fomenko | G06F 8/71 709/220 |
| 2005/0262107 | A1 * | 11/2005 | Bergstraesser | G06F 17/30607 |
| 2009/0077044 | A1 * | 3/2009 | Krishnaswamy | G06F 17/30551 |
| 2009/0276771 | A1 * | 11/2009 | Nickolov | G06F 9/4856 717/177 |
| 2009/0300580 | A1 * | 12/2009 | Heyhoe | G06F 8/71 717/106 |
| 2010/0153919 | A1 * | 6/2010 | Kramer | G06Q 10/06 717/122 |
| 2013/0014084 | A1 * | 1/2013 | Sahibzada | G06F 11/368 717/124 |
| 2014/0222758 | A1 * | 8/2014 | March | G06F 17/3023 707/638 |
| 2014/0279903 | A1 * | 9/2014 | Hsiao | G06F 17/30377 707/638 |
| 2015/0106790 | A1 * | 4/2015 | Bigwood | G06F 11/3624 717/127 |

(Continued)

*Primary Examiner* — Chameli Das

(57) ABSTRACT

A customer's Version Control System (VCS) is set up to store files associated with an application having application versions. The customer's VCS includes a set of branches defined correspondingly to a set of systems of a customer change management landscape. A first branch comprises files of a first version of the application. A second version of the application is populated into the first branch. Existing customizations, modifications, and created runtime authoring objects during design time and runtime of the first version of the application are applied over the second version. The changes are submitted into the customer's VCS and an updated version is generated in the first branch. The updated version is transported to a second branch through merging the first branch and the second branch. When a request for deployment is received, a reference to the second branch pointing to the updated version of the application is provided.

16 Claims, 9 Drawing Sheets

(56) References Cited

U.S. PATENT DOCUMENTS

2016/0092525 A1* 3/2016 Kothari ............ G06F 17/30563
                                                     707/602
2016/0092526 A1* 3/2016 Kothari ............ G06F 17/30563
                                                     707/602

* cited by examiner

VERSION CONTROL FOR CUSTOMIZED APPLICATIONS

BACKGROUND

Infrastructure platforms may provide different runtime environments for deploying and running applications. Software vendors provide runtime environments as part of the infrastructure platforms, such as Java® Platform, Enterprise Edition (Java EE) runtime environment, node.js open-source runtime environment, vendor proprietary runtime environments, etc. The provided runtime infrastructures may be in cloud setup or in on-premise setup. Application servers may be provided by the runtime infrastructures for hosting applications. The application servers facilitate development of applications and provide environment for deploying and running the applications. The application servers may include repositories to store deployed artifacts part of deployed application bundles. The application servers may also use external repositories for storing the deployed artifacts.

A customer may utilize a platform infrastructure including a runtime infrastructure to install applications provided by application vendors. The provided applications may be configured and/or individualized to serve customer's needs and requirements. The platform infrastructure may also provide development infrastructure. The development infrastructure may be used to create customer's own applications, and/or to extend functionality of vendor provided applications, and/or to define configurations and individualized customizations for applications. A customer system landscape includes different applications running on a customer-defined runtime infrastructure. The different applications may run on systems defined in a change management landscape. The change management landscape may be defined for the customer and may follow a release management of software applications. For example, a change management landscape may include a set of systems that may be correspondingly associated with a change management flow. The change management flow may include a requirements management, a development process, a test management, a software production, etc. Typically, customers have their own systems for development, testing, and running applications in a production manner Change management landscape assists managing changes in the customer system landscape. Changes can be made in relation to new versions of applications provided by a vendor, changes for individualization and modification of existing and integrated applications, and also creation of new functionalities for existing applications. Applications may be defined and developed in a number of versions during applications' lifecycle. Version control systems (VCS) may be used to manage changes in the source code, metadata, other collections of information associated with the applications. There are different VCS that may be used, such as Git or Apache Subversion (often abbreviated SVN).

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for delivering customized applications in a customer system landscape via version control systems are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
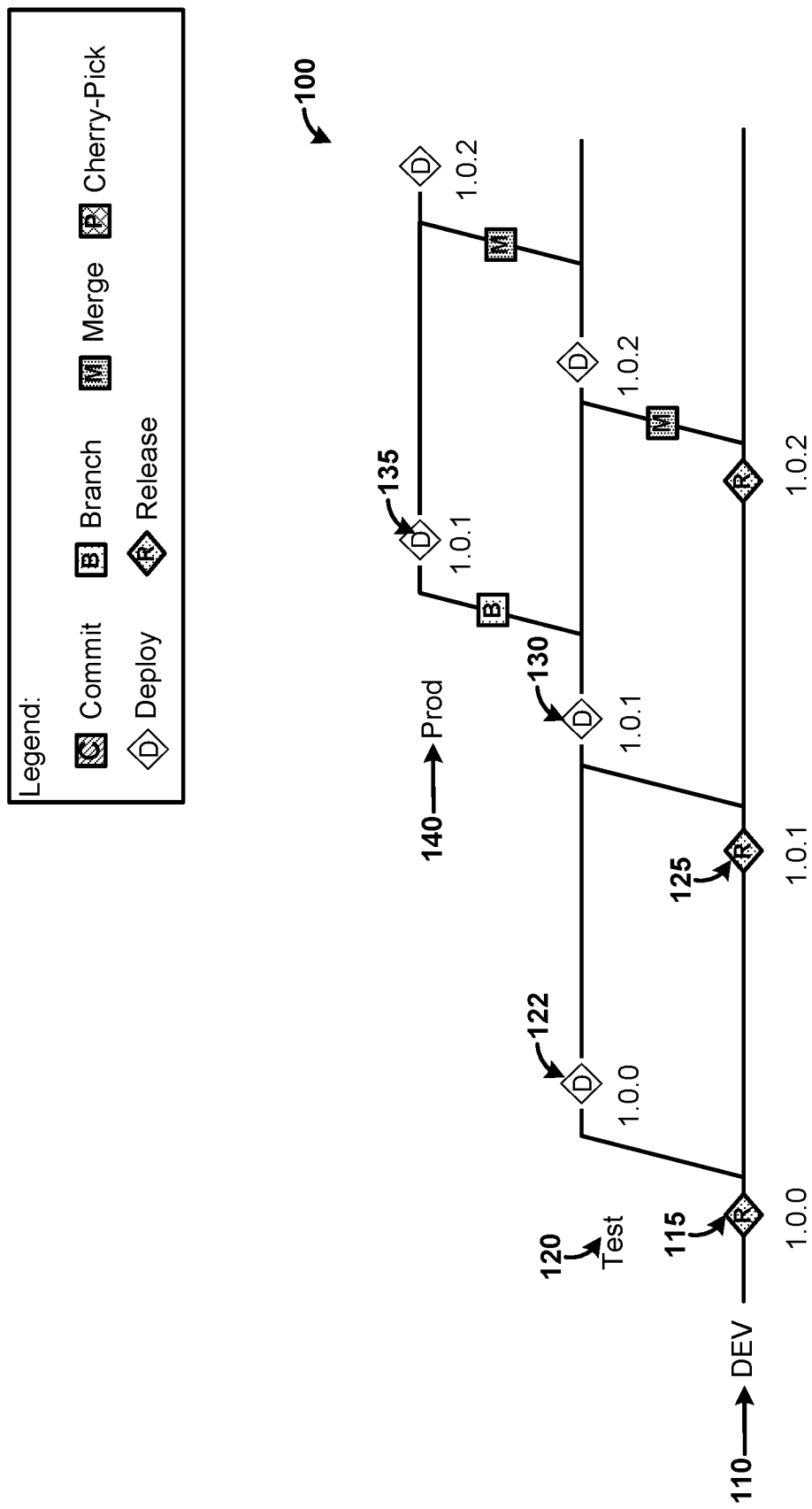
FIG. 1 is a flow diagram illustrating a process for delivering customized applications in a customer system landscape via a VCS, according to one embodiment.

FIG. 1 is a block diagram illustrating a process for delivering customized applications in a customer system landscape via a VCS, according to one embodiment. An application may have a dedicated VCS to be used for storing files associated with different versions of the application. The different version of the application may be defined at different stages of application development and productive use in end-to-end use case scenarios. The application's lifecycle may define a flow including integration of a released application in a development system, testing the integrated application in a testing system, releasing the application for productive use in a production system, etc. A customer change management landscape may include systems, such as the development system, testing system, and production system. Further systems may be defined for the customer change management landscape. The VCS may be used for managing changes in applications provided by application vendors and integrated in a customer's environment. The customer change management landscape may be associated with defined stages of application lifecycle. The VCS may define a set of branches to correspond to the different stages of the application lifecycle. The VCS may store files of applications in a directory structure. The files may be not stored as compressed archives, but as a plain directory structure including single files.

In one embodiment, a directory of files in a branch in the VCS can be loaded with files from a vendor's VCS. Also, the files may be downloaded as a compressed archive, unpacked into a directory structure and uploaded to a customer's VCS. The set of branches from the customer's VCS may provide different views of an application. For a given application, some files stored in a directory in a branch can be different when compared with files stored in an another branch that are also associated with the same application.

An exemplary customer's VCS is presented in block 100. The VCS is defined in relation to a defined change management landscape for a customer. The customer's VCS may be dedicated to a defined application from a customer system landscape. The VCS stores files of the application in the set of branches as in a repository. The VCS includes a dev 110 branch, a test 120 branch and a prod 140 branch. The customer change management landscape may further define systems such as a pre-production system, an integration system, a quality assurance system, and so on. The set of systems defined for the customer change management landscape is defined in a chain following an application lifecycle defined for the customer. The set of systems may be defined based on an integration complexity of a customer system landscape. The customer system landscape defines a number of systems that are deployed and run simultaneously on a system from the set of systems defined for the customer change management landscape. For example, the customer system landscape may include an Enterprise Resource Planning (ERP) application, a Customer Relationship Management (CRM) application, a Business warehouse (BW) application, etc. A branch in the VCS presented in block 100 is assigned to a system from the customer change management landscape. For example, the dev 110 branch is assigned to a development system. Applications from the customer system landscape may be deployed and started on the development system. Further, the test 120 branch is assigned to a testing system, and the prod 140 branch is assigned to a production system. The testing system is used for testing activities performed over the defined application. The production system may be used by end users of the application in production use cases of utilizing the provided functionality.

In one embodiment, a delivery of an application version of the application for deployment in a targeted system from the customer change management landscape is brought to a customer's VCS repository before actually deployment. The dev 110 branch is populated with a first version of the application—version "1.0.0" 115. The version "1.0.0" 115 of the application may be released and provided by an external software vendor or may be a result of a customer's own application development. The files of the version "1.0.0" of the application may be populated in the first dev 110 branch.

The version "1.0.0" 115 of the application may be passed from the dev branch 110 to the test branch 120 by merging the branch assigned to the development system to the branch assigned to the testing system. The version "1.0.0" 115 of the application is kept in the VCS together with the previous and the subsequent versions that are also accessible in the VCS. When the dev 110 branch and the test 120 branch are merged, the test 120 branch includes content from the dev 110 branch for the version "1.0.0" 115 of the application. The test 120 branch includes a version "1.0.0" 122 that replicates the version "1.0.0" 115. Then, the test 120 branch may be synced to a file system of a corresponding system from the set of systems defined in the customer change management landscape. The "1.0.0" 122 version of the application may be deployed on a runtime environment of the corresponding system. The corresponding system may provide infrastructure for performing testing activities over the version "1.0.0" 122.

In one embodiment, a change of the application may include a change provided by the application vendor, modifications over source code of the application, or addition of new source code in relation to additional functionality enhancing the application, etc. Changes to the application may not be created by deploying a first version of the application and performing a delta deployment of the modified and added files from the application. A change to the application may be applied over the files of the application and merged in the VCS. The merged content (including deployable compiled files from the application bundle) may be deployed at one step as one bundle defined based on the files including the changes.

In one embodiment, a new version "1.0.1" 125 of the application is released and populated in the dev 110 branch in the VCS, together with the previous "1.0.0" 115 version of the application. The new version "1.0.1" 125 may be merged into the test 120 branch. The test 120 branch is populated with a copy of the new version "1.0.1" 125 in a subdirectory. The subdirectory incorporates a version "1.0.1" 130 of the application. The version "1.0.1" 130 from the test 120 branch may be also deployed on the corresponding system. Testing activities may be performed over the deployed version "1.0.1" 130. After the testing activities are executed successfully, the version "1.0.1" 130 is ready for working in a production mode. The version "1.0.1" 130 from the test 120 branch is merged to the prod 140 branch. A final version "1.0.1" 135 is stored in the prod 140 branch that may be deployed in a corresponding system from the customer change management landscape.

Figure 2:
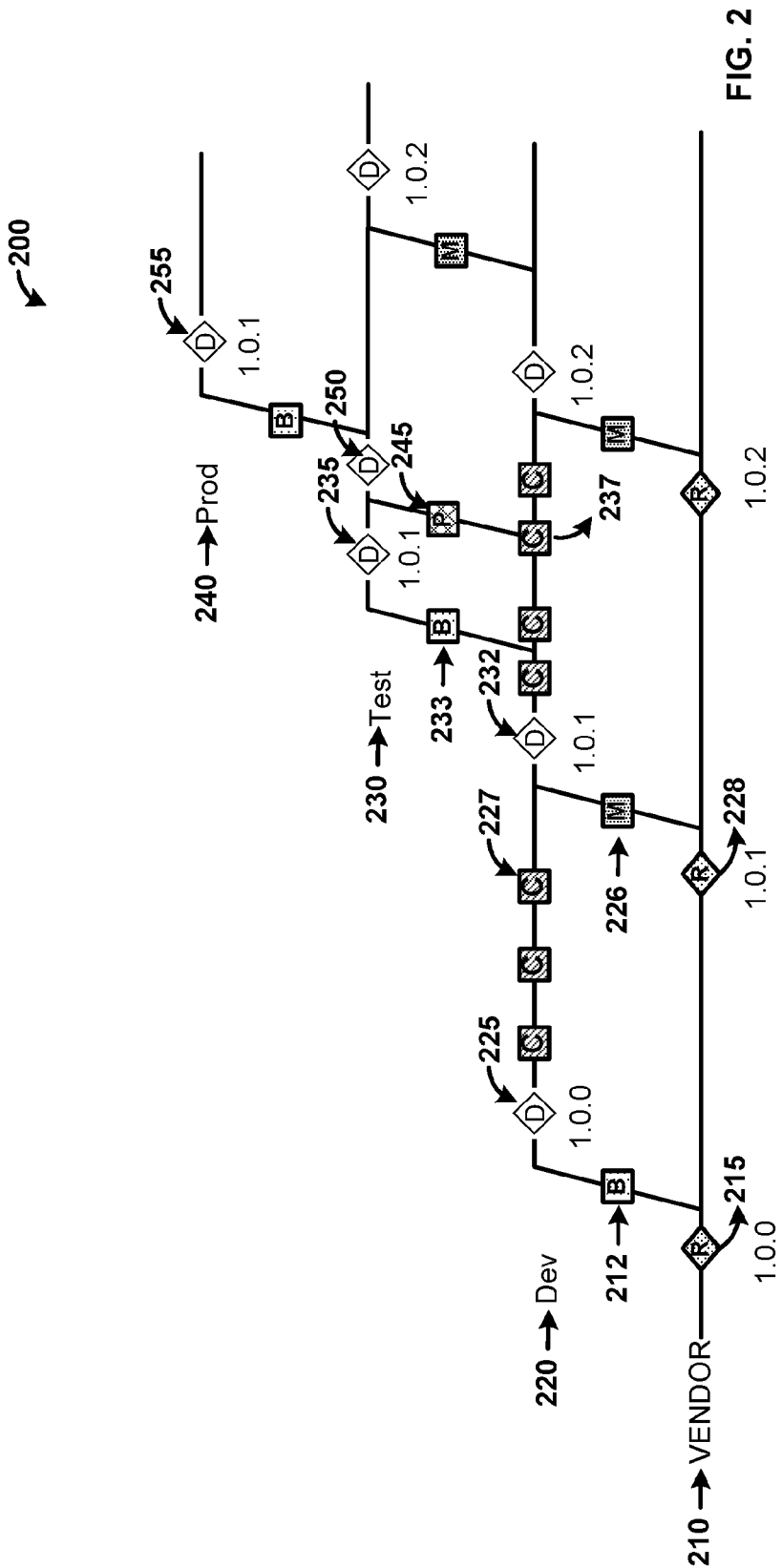
FIG. 2 is a block diagram illustrating a process for customizing applications in a change management landscape via a VCS, according to one embodiment.

FIG. 2 is a block diagram illustrating a process 200 for customizing applications in a change management landscape via a VCS, according to one embodiment. The VCS may be such as the described VCS in relation to FIG. 1. The VCS may be a customer's VCS designated to a particular application and a customer of the application. The VCS may be associated with a specific application and a defined customer of the application. The VCS includes a set of branches, which are defined to correspond to a set of systems defined for a customer change management landscape of the application. The customer of the application may impose specific requirement and customizations that may reflect the application, the application's lifecycle, application's configurations, customizations, modifications, and other.

In one embodiment, the VCS is represented in block 200, where four branches are defined—a vendor 210 branch, a dev 220 branch, a test 230 branch, and a prod 240 branch. For the representation of the VCS in block 200, a legend 205 is used to identify different operations performed over different application versions marked in block 200. Identifications may be presented in the representation of the VCS in block 200. Identifications with an "R" mark may be put for a release of a version of the application. Identifications with a "C" mark may be put for commit operations. Commit operations may be associated with changes in source files of a particular version of the application, changes related to customizations of the particular version to customer's requirement, or other runtime authoring activities during runtime of the application. Identification marks may be further used to suggest when a version of the application is deployed, or branched, or when two defined branches are merged to transfer content from one of the branched to the other. Further, a "cherry-pick" identification mark may be used within the block 200 to identify that a particular commit operation is transported to another branch following the flow suggested by the customer change management landscape.

In one embodiment, the vendor 210 branch may be populated with released versions of the application. The application versions may be released from a vendor of software applications. The vendor 210 branch may be populated with versions of the application through connecting to a VCS of the vendor. Relevant files for a particularly selected version of the application may be downloaded from the vendor's VCS to the customer's VCS (as represented in block 200). The vendor 210 branch is populated with a first version "1.0.0" 215 of the application. The vendor 210 branch may be branched into the dev 220 branch. A replicated version "1.0.0" 225 of the version "1.0.0" 215 in the dev 220 branch is deployed on a corresponding system from the customer change management landscape. The system corresponds to a development system.

Different changes may be applied over released versions of the application in order to fulfill customer requirements. The customer requirements may be associated with integration of the application into a customer system landscape, customer scenarios performed with the application, customer platform infrastructure requirement for running the application, optimization configurations, other. Changes over versions of the application are indicated as commits in the VCS. The version "1.0.0" 225 may be updated with different changes that are marked as commits in the dev 220 branch according to legend 205. For example, a commit 227 may suggest modifications to source code within files from the files of the version "1.0.0" 225 of the application.

When a new version is released by the vendor of the application, the vendor 210 branch may be populated with the new released version "1.0.1" 228. The new released version "1.0.1" 228 may be merged in the dev 220 branch to transfer a replicated version "1.0.1" to the dev 220 branch. Updates over the version "1.0.1" 232 in the dev 220 branch may be further customized to incorporate changes defined for the first version "1.0.0" 225 with the provided commits Such changes may be relevant for a next version of the application and therefore may be incorporated into the version "1.0.1" 232 with a commit operation. Afterwards, the version "1.0.1" 232 of the application together with the applied changes may be branched into the test 230 branch. The branching operation is marked at block 233. In the test 230 branch, version "1.0.1" 235 is created and deployed on a corresponding system to the test 230 branch. The version "1.0.1" 232 replicates the customized newly released version from the vendor. The version "1.0.1" 232 is tested in a testing system. Within the dev 220 branch, further commit operations may be performed over the deployed version "1.0.1" 232, that are yet to be transported into the testing system. A commit operation 237 is performed in the dev 220 branch, which is selected for a "cherry-pick" operation 245. The "cherry-pick" operation 245 translates the defined changes with the commit operation 237 into the test 230 branch. A new version 250 of the application in the test 230 branch is marked to be deployed on the testing system corresponding to the test 230 branch. After performing testing operations that do not suggest further commit operations, the version 250 is branched into the prod 240 branch as version "1.0.1" 255. The version "1.0.1" 255 is deployed on a runtime infrastructure provided from a production system for the customer. The version "1.0.1" 255 runs and may serve end user requests in productive real use cases, utilizing general functionality provided from the vendor of the application, and also functionality and customizations that are customer specific and are associated with the customer.

Figure 3:
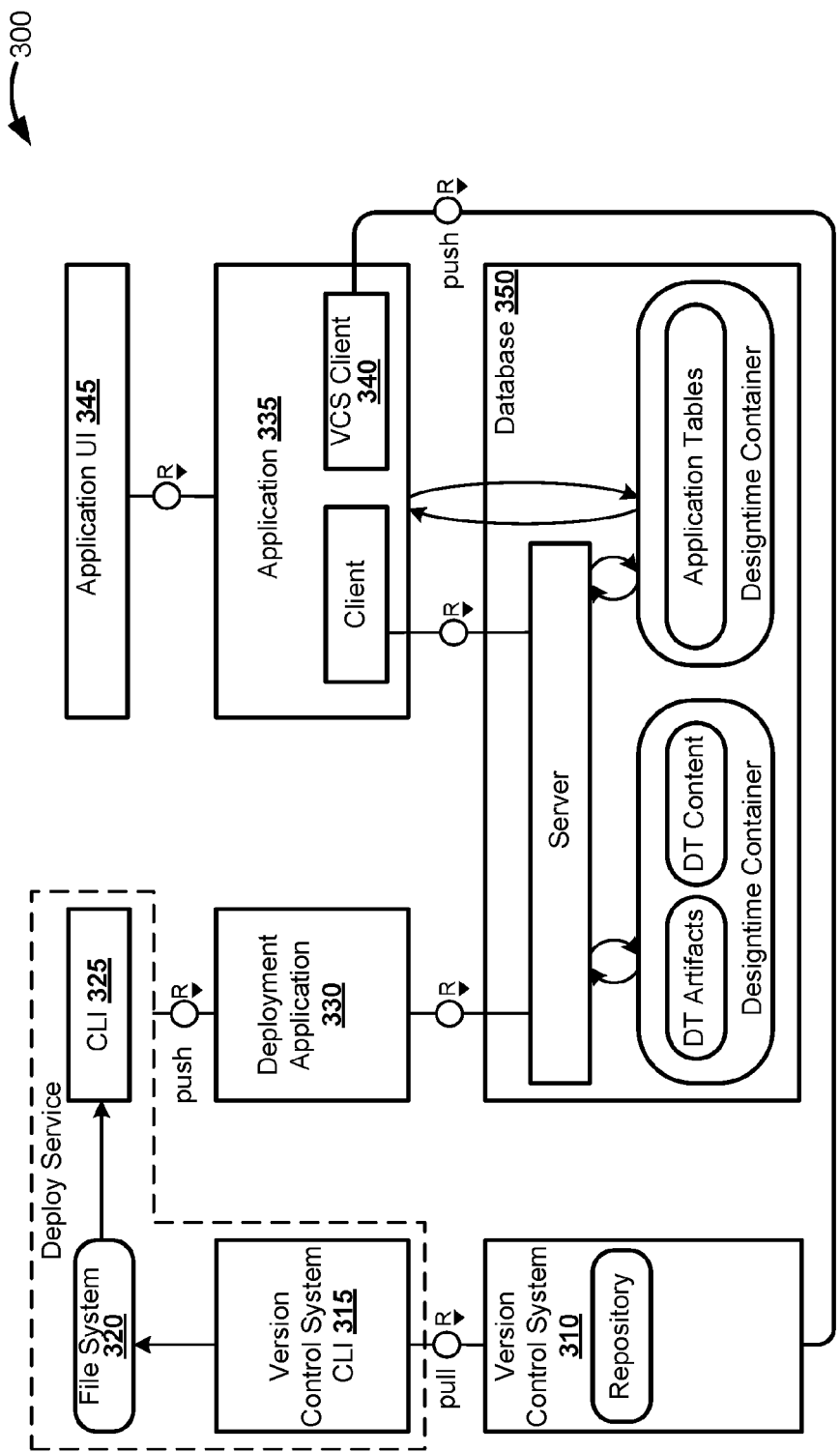
FIG. 3 is a block diagram illustrating a system environment for delivering customized applications in a customer system landscape via a VCS, according to one embodiment.

FIG. 3 is a block diagram illustrating a system environment 300 for delivering customized applications in a customer system landscape via a VCS, according to one embodiment. An application may be deployed and used in customer's scenarios. The application may be deployed on a runtime infrastructure that corresponds to application's requirements. The application may be provided by an application vendor or may be internally developed. Specific customizations may be performed to adjust the application to serve customer's needs. Therefore, customizations may be applied over a received version of the application, e.g. from the vendor. Additionally, the vendor may iteratively release new versions of the same application that include some changes over the functionality of the application. For example, such changes my enhance the functionality provided by the application, or may suggest new functionality. When a particular version is integrated into a customer system landscape, and customizations are performed over that particular version, the integration of a newer version released by the vendor may impose some readjustments over the newer version. The newer version of the application may incorporate the configurations made for the previous version of the application.

A vendor of software applications may set up a vendor's VCS. The vendor may secure the VCS and define authorization and authentication rights for accessing content on the VCS. The vendor's VCS includes a repository for storing files for different versions of applications. The files may be stored in the repository in a file directory structure, where subdirectories correspond to the different versions and include single files. Single files related to a version of the application may be bundled and deployed on a targeted runtime infrastructure. The vendor's VCS may provide a first version of an application that may be downloaded to a customer's VCS 310. The customer's VCS 310 may correspond to the representation of the VCS in block 200, FIG. 2. The customer's VCS may include a set of branches that are defined to correspond to a set of systems defined for a customer change management landscape. The customer's VCS may be associated with a deploy service that manages the deployment of applications on runtime infrastructure designated for the application with a particular version.

In one embodiment, the first version of the application is populated in a first branch from the set of branches in the customer's VCS 310. The first branch may be merged into a second branch, such as the dev 220 branch, FIG. 2. The first version of the application may then be deployed from the second branch to a corresponding system from the customer change management landscape. For example, the corresponding system may be a development system. The first version of the application that is transferred from the vendor's VCS to the customer's VCS 310 may be invoked from the customer's VCS 310 through a VCS command line interface (CLI) 315 associated with a deploy service. The invoked first version may be provided to a files system 320 by the deploy service. Through a deployment CLI 325, the deploy service may take files from the file system 320 that are associated with the first version of the application. The files that are invoked may be bundled by the deploy service into a deployable application bundle. The application bundle may be provided by the deploy service to a deployment application 330. The deployment application 330 may communicate with a database 350. The database 350 may be provided as part of a platform infrastructure where applications from a customer system landscape are deployed. The database 350 includes a server, where the applications may be deployed. The database 350 may further include design-time containers, where content and artifacts of the deployed applications are stored. The deployment application 330 deploys the first version of the application on the server in the database 350.

The first version of the application runs to serve requests, for example send by end users. The running application in its first version may include application logic defined in application 335 block and may provide an application user interface (UI) 345. The application 335 may incorporate a VCS client 340 that may store configurations that are created during runtime of the first version of the application. The configurations may be associated with creating runtime authoring objects. Such runtime authoring objects may be created through the application UI 345. Created content from runtime authoring operations may be stored as objects in the VCS client 340. The runtime authoring objects from the VCS client 340 may be pushed to the customer's VCS 310. Therefore, when a next version for the application is defined in the customer's VCS, the runtime authoring content that is generated for the first version may be reapplying to the next version. The next version of the application may be downloaded from a vendor's VCS when the vendor provides a new release of the application. The next version of the application may also be created as part of functionality modifications performed in a development phase of the customer. Such changes over the next version of the application may be performed through commit operations in a given branch in the customer's VCS 310.

In one embodiment, the first version of the application may be deployed on different systems from the set of systems defined for a customer change management landscape. The different system may provide runtime infrastructures for deploying the application. For example, the deployment application 330 may select a system that is targeted for testing purposes over the first version of the application. The selection of the system may be based on the request for deployment of the first version of the application from a particular branch from the set of branches defined in the customer's VCS. Based on performed operations during testing on the testing system, changes over files of the first version may be performed in a development mode. The changes that may be requested may also be associated with a generation of more files or metadata apart from the files of the first version. Then, the first version of the application may be deployed on a development system through deploying corresponding content from a branch corresponding to a development phase from the change management landscape. Commit operations may be performed for the changes over the deployed first version of the application in the development system.

Figure 4:
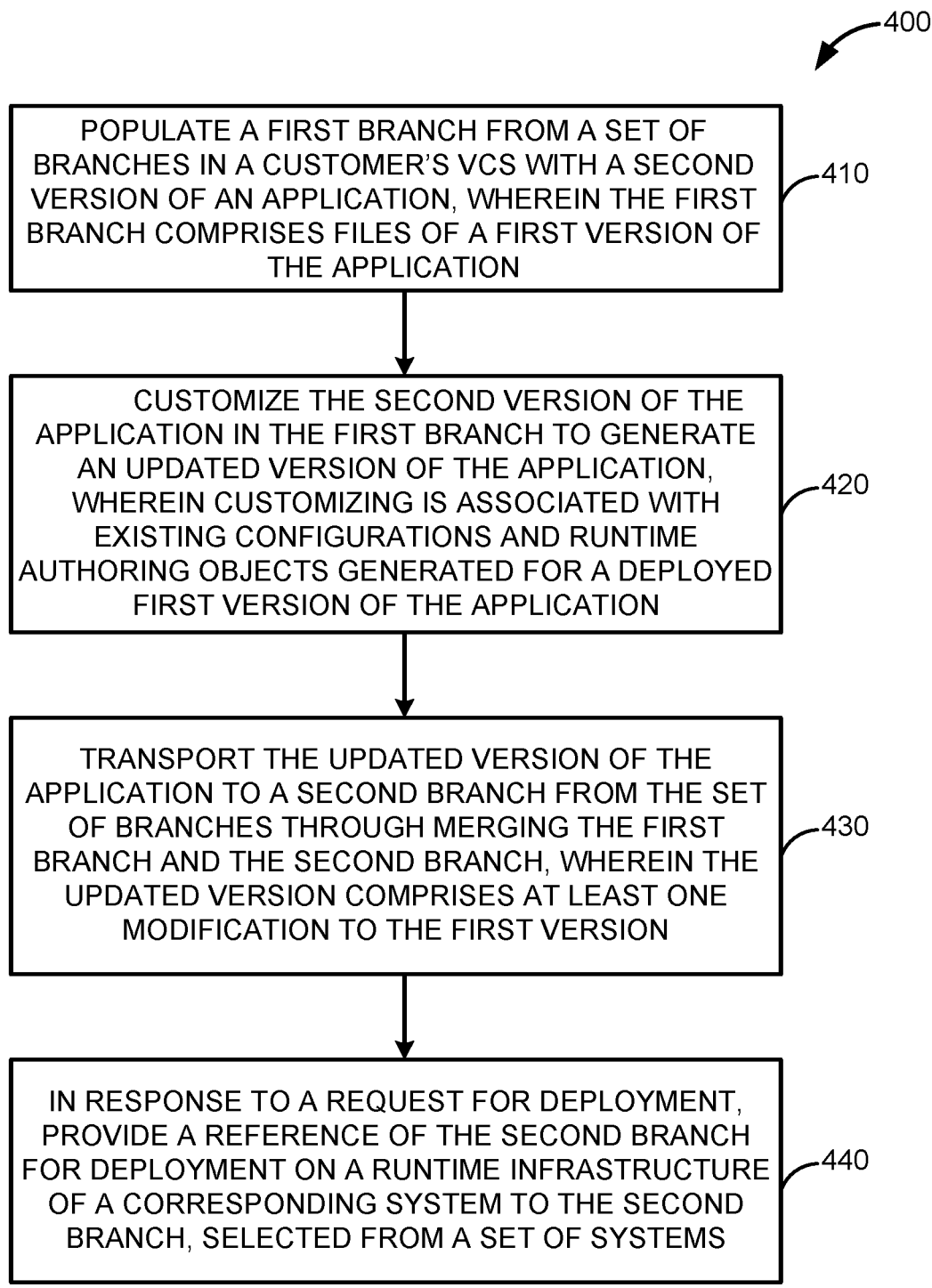
FIG. 4 is a flow diagram illustrating a process for delivering customized applications in a customer system landscape via a VCS, according to one embodiment.

FIG. 4 is a flow diagram illustrating a process 400 for delivering customized applications in a customer system landscape via a VCS, according to one embodiment. The VCS may be such as the discussed VCS in relation to FIG. 1, FIG. 2, and FIG. 3. The VCS may be associated with a particular application and a particular customer of the application. The application may be provided by a vendor of applications through a vendor's VCS. A vendor's VCS may be connected to a customer's VCS and files associated with a first version of the application may be downloaded. The application may be released through the vendor's VCS in several versions that may be provided iteratively. Therefore, the versions may be iteratively re-integrated into the customer system landscape. In the customer system landscape, the first version of the application may be deployed and started on a particular system. When a next version is downloaded to the vendor's VCS, re-integration of the next version may be initiated in the customer system landscape.

At 410, a first branch from a set of branches in a customer's VCS is populated with a second version of the application. The first branch also comprises files of a first version of the application. The first branch may be such as the dev 220 branch, FIG. 2. The first version of the application may be such as the version "1.0.0" 225 of the application in the dev 220 branch, FIG. 2. The second version of the application may be such as the version "1.0.1" 232 of the application in the dev 220 branch, FIG. 2. At 420, the second version of the application is customized in the first branch to generate an updated version of the application. The customization may comprise a number of commit operations defining changes over the first version of the application. The customizations are associated with existing configurations and runtime authoring objects generated for a deployed first version of the application. As discussed in relation to FIG. 2, the commit 227 operation may suggest modifications to source code within files from the files of the first version "1.0.0" 225 of the application in the dev 220 branch in the customer's VCS. Such source code modifications may be applied over the second version. The customization of the second version may re-apply defined changes including modifications to source code, re-applying defined configurations, re-creation of generated runtime authoring objects, etc.

At 430, the updated version of the application is transported to a second branch from the set of branches through merging the first branch and the second branch. The updated version of the application comprises at least one modification to the first version of the application. At 440, in response to a request for deployment, a reference of the second branch is provided for deployment of the updated version of the application. The request for deployment may be received for deployment on a corresponding system from the set of systems. The set of systems may be defined in relation to a customer change management landscape. The deployment of the updated version of the application is performed on a runtime infrastructure of the corresponding system. The corresponding system may be, for example, a system for development purposes. The set of systems are also associated with a customer system landscape. The customer system landscape includes a set of systems and/or applications that are deployed on a particular platform system and run together.

Figure 5:
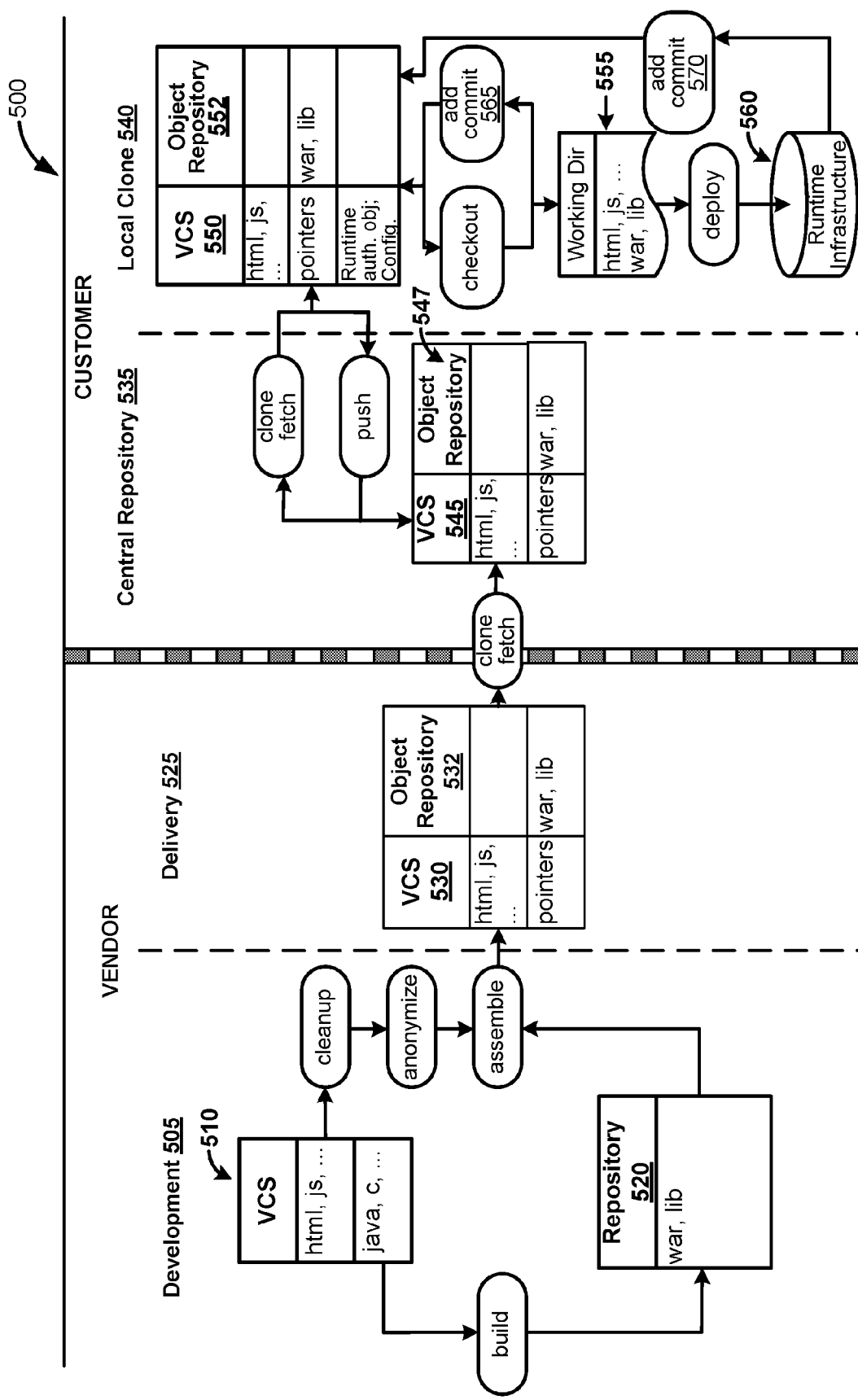
FIG. 5 is a block diagram illustrating a system environment for integrating customizations to applications provided from a vendor's VCS into a customer system landscape via a customer's VCS, according to one embodiment.

FIG. 5 is a block diagram illustrating a system environment 500 for integrating customizations to applications provided from a vendor's VCS into a customer system landscape via a customer's VCS, according to one embodiment. The system environment 500 may be divided into two sections—a vendor's environment and a customer's environment. The vendor's environment is a system environment of a vendor of software applications. At the vendor's environment, there is an infrastructure for applications development 505 and an infrastructure related to a delivery 525 of the applications to customer.

When applications are developed in the vendor's environment, source code, metadata, and other data and files related to applications may be stored in a vendor's internal VCS 510. The files stored in the VCS 510 may be related to the UI of the applications and to the applications' logic. The vendor's internal VCS 510 may include different type of files of applications, such as HyperText Markup Language (HTML) files, Java© script files, source code files defined in different programming languages, such as Java®, C®, etc. The vendor's internal VCS 510 may comprise a source referential for version control, where features like merging, branching, committing, tagging, etc. are provided. In the vendor's internal VCS 510 change management during developing of different versions of applications may be supported. The vendor's internal VCS 510 may store views of the files associated correspondingly with different applications' versions. The stored views are snapshots of current states of files related to the corresponding applications and applications' versions. The vendor's internal VCS 510 may support development of the applications and a generation of new versions of the applications. Based on files from the vendor's internal VCS 510, an application may be built through a build operation and compiled files may be stored as binary archives objects in a repository 520.

In one embodiment, the repository 520 may be an application's artifact referential for delivery of applications from the vendor's environment. The delivery of an application may include binary artifacts, source code for interpreted languages, compiled artifacts for compiler languages, UI definitions, DB artifact definitions, metadata, other artifacts related to the delivery application. Content, associated with a particular application from the repository 520, may be assembled and transferred to a VCS 530 and an object repository 532. The VCS 530 and the object repository 532 may be part of the delivery 525 environment on the vendor's side. The object repository 532 includes build results including compiled archive files ready for deployment and metadata related to the built application. The files from the object repository may be such as Java® Archives (JARs), Web application ARchives (WARs), libraries (lib), Java® Script files, HTML files, database artifact definitions, etc.

The VCS 530 may be a vendor's VCS for delivering applications for external deployment. The VCS 530 stores content in a defined directory structure. The VCS 530 may store source code files and also may store references as pointers to source code files stored in the VCS 510 repository. The VCS 530 may be such as the VCSs described in relation to FIG. 1, FIG. 2, and FIG. 3. The VCS 530 may be set up in a secured zone of a vendor's network where the VCS 530 may be accessible for external requests.

The customer's environment may include a central repository 535 and a local clone 540. The central repository 535 includes a VCS 545 and an object repository 547. The central repository 535 may be used for storing files and/or references to files related to applications that are delivered from vendors. The delivered applications from the vendor may be deployed on runtime infrastructures per requests from the customer. The VCS 545 may be a customer's VCS that fetches content associated with released application versions from the VCS 530. The object repository 547 may be connected to the object repository 537 and may fetch content in relation to the applications that are delivered from the vendor's delivery 525 side. The local clone 540 of the customer's environment includes a VCS 550 and an object repository 552. The local clone 540 is associated with an application that is integrated into a customer system landscape. The VCS 550 and the object repository 552 fetch content from the VCS 545 and the object repository 547 associated with the application. Files from the VCS 550 may be deployed on a targeted runtime infrastructure provided by a corresponding system to a branch from the VCS 550. At the customer's environment, configurations and runtime authoring may be performed over integrated deployed application. Such changes to the application may be such as the discussed changes in relation to FIG. 1, FIG. 2, and FIG. 3. The changes may be performed through commit operations in the VCS 550.

In one embodiment, files from the VCS 550 may be checked out into a working directory 555. The check-out operation may be associated with a particular branch from the VCS 550, for example files may be checked out from a development branch. The working directory 555 copies files and changes may be applied over the files. Content of the working directory 555, including copies filed or modified files, may be deployed on a runtime infrastructure 560. The runtime infrastructure may be part of a system from the change management landscape of the customer. Changes, applied over files in the working directory 555 may be added during design time of the application with an add commit 565 operation into the VCS 550. During runtime of the application on the runtime infrastructure 560, additional configurations and runtime authoring objects may be created. Such configurations and runtime authoring objects may be stored locally on the runtime infrastructure, on a dedicated storage, or a database. After such runtime authoring activities, an add commit 570 operation may be performed that transfers generated content during runtime to the VCS 550. Based on such content, when a new version of the application is about to be deployed, previously defined configurations and objects may be re-applied over the deployed new version of the application. The new version of the application may be received from the vendor's VCS or may be generated based on changes over the application performed in the customer's environment. For example, the created runtime authoring objects and configurations may be reapplied over the new deployed version of the application through running a script to customize the application. The customizations may correspond to the content in the runtime authoring objects and configuration files.

Figure 6A:
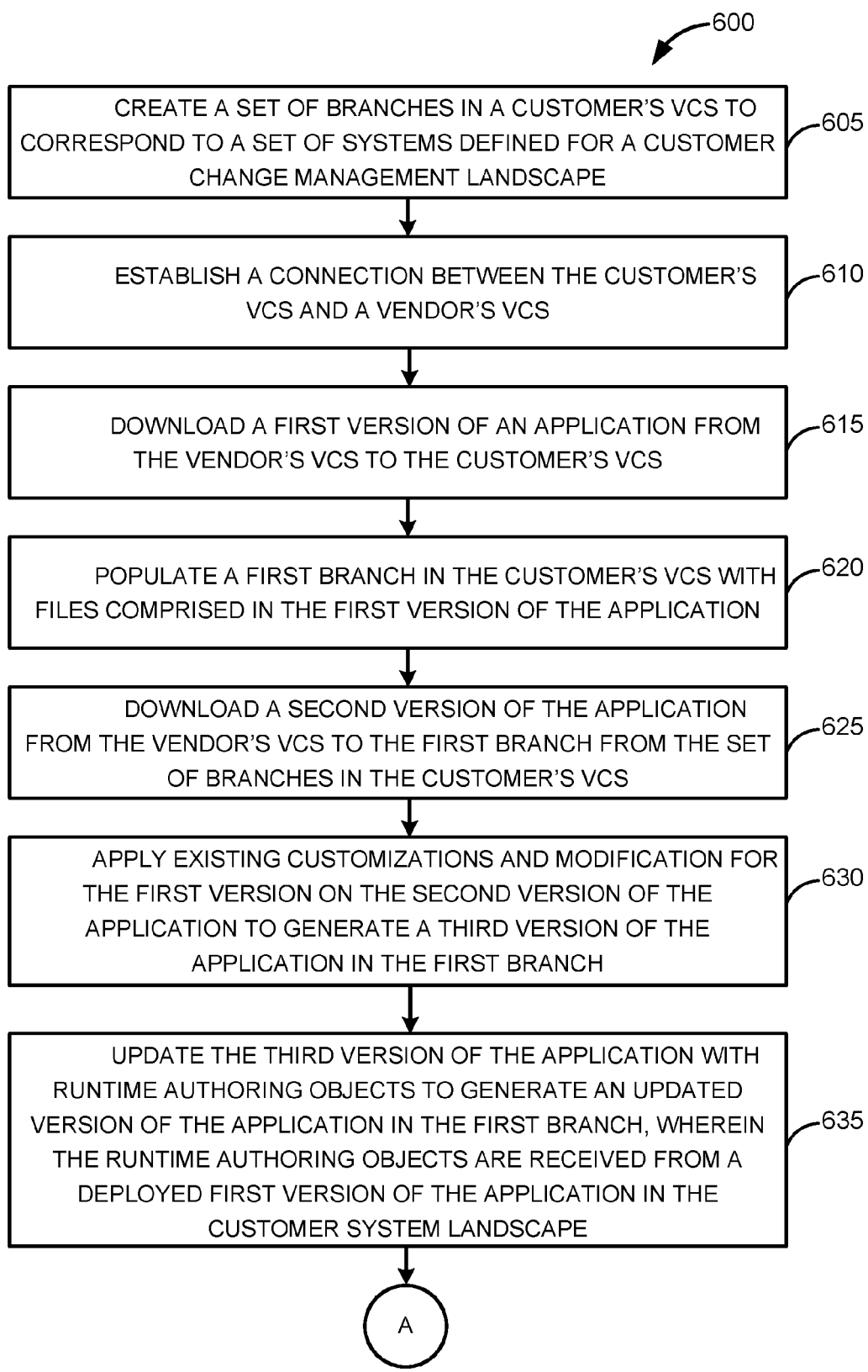
FIG. 6A and FIG. 6B are flow diagrams illustrating a process for customizing applications in a change management landscape via a customer's and a vendor's VCS, according to one embodiment.
Figure 6B:
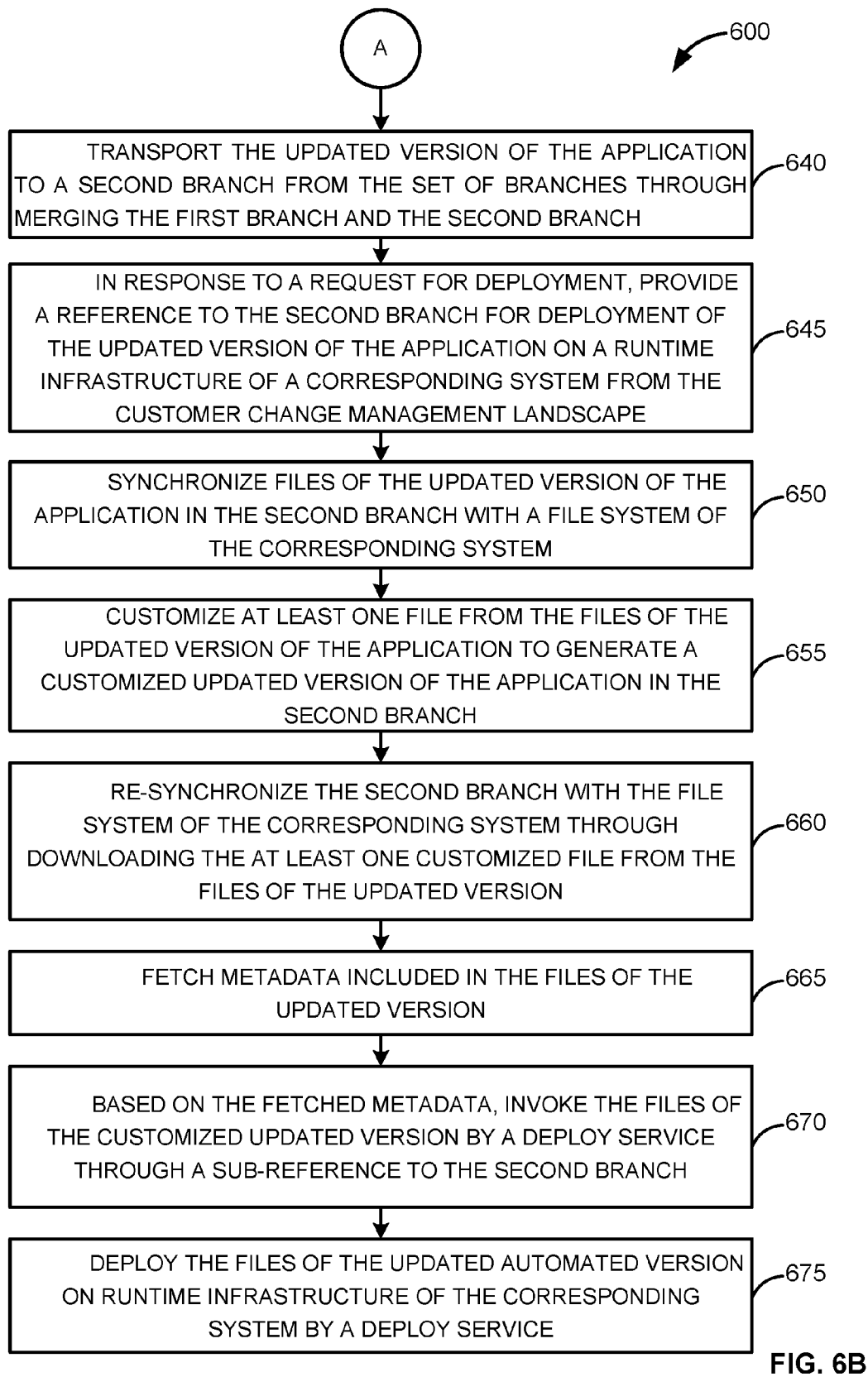

FIG. 6A and FIG. 6B are flow diagrams illustrating a process 600 for customizing applications in a change management landscape via a customer's and a vendor's VCS, according to one embodiment. The customer's VCS may be such as the VCS described in relation to FIG. 1, FIG. 2, and FIG. 3. The vendor's VCS may be as the described VCS 530 in FIG. 5. The vendor's VCS may be set up for delivering releases of applications' versions for customer's use. At 605, a set of branches is created in the customer's VCS to correspond to a set of systems defined for a customer change management landscape. The set of branches may be defined based on an integration complexity of a customer system landscape defining one or more applications to be deployed on the set of systems defined for the customer change management landscape. At 610, a connection between the customer's VCS and the vendor's VCS is established. At 615, a first version of an application is downloaded from the vendor's VCS to the customer's VCS. At 620, a first branch in the customer's VCS is populated with files comprised in the first version of the application. For example, the populated first branch with files associated with the first version of the application may be such as the version "1.0.0" 225 in dev 220 branch in FIG. 2. At 625, a second version of the application is downloaded from the vendor's VCS to the first branch in the customer's VCS. At 630, existing customizations and modification for the first version of the application are applied on the second version of the application to generate a third version of the application in the first branch. At 635, the third version of the application is updated with runtime authoring objects to generate an updated version of the application in the first branch. The runtime authoring objects are generated for the first version of the application during runtime. The runtime authoring objects are received from a deployed first version of the application in the customer system landscape.

At 640, the updated version of the application is transported to a second branch from the set of branches through merging the first branch and the second branch. At 645, in response to a received request for deployment of the application, a reference to the second branch is provided for deployment of the updated version of the application. The deployment of the application is on a runtime infrastructure of a corresponding system to the second branch. The corresponding system is determined from the set of systems defined for the customer change management landscape. At 650, files of the updated version of the application in the second branch are synchronized with a file system of the corresponding system. At 655, at least one file from the files of the updated version of the application is customized A customized updated version of the application is generated in the second branch. At 660, the second branch is re-synchronized with the file system of the corresponding system through downloading the at least one customized file from the files of the updated version. At 665, metadata included in the files of the updated version of the application is fetched. The metadata may be fetched by a product installer associated with the application. The product installer may determine a relevant deploy service and provide references to the VCS of the customer in relation to the application and application versions. For example, the updated version of the application may be requested for deployment, or the customized updated version of the application may be requested. Based on such a request, files corresponding to the requested version may be invoked by the relevant deploy service.

The invoking of files may be associated with a request for deployment of the customized updated version of the application. At 670, based on the fetched data, the files of the customized updated version of the application are invoked through a to the second branch. The sub-reference to the second branch points to the customized updated version of the application. At 675, the files of the customized updated version of the application are deployed on a runtime infrastructure of the corresponding system from the set of systems from the customer change management landscape. The corresponding system is associated with the second branch. The deployment of the files is performed by a deploy service.

Figure 7:
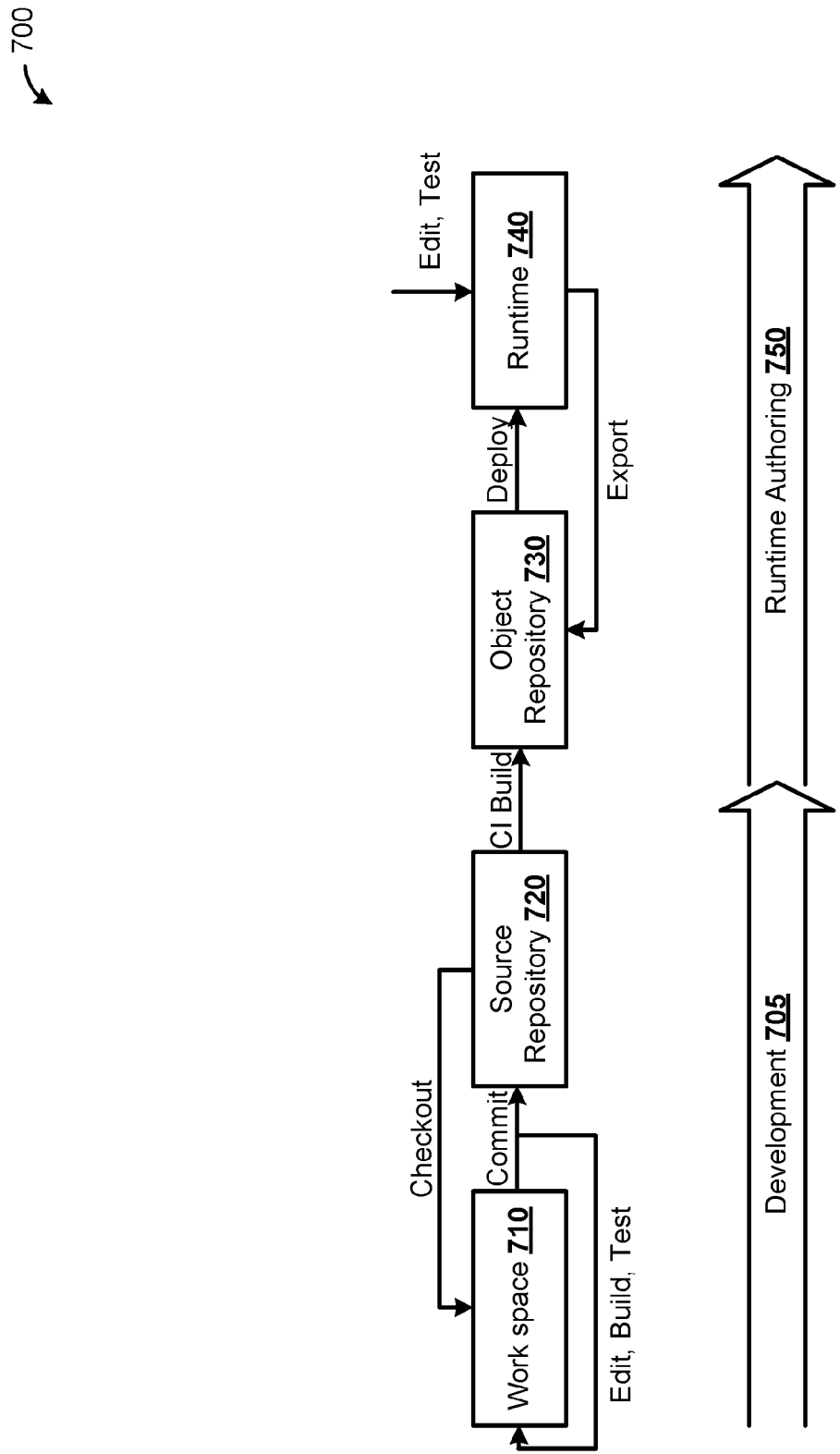
FIG. 7 is a block diagram illustrating a process for developing and generating runtime authoring objects for an integrated vendor provided application in a customer system landscape, according to one embodiment.

FIG. 7 is a block diagram illustrating a process 700 for developing and generating runtime authoring objects for an integrated vendor provided application in a customer system landscape, according to one embodiment. A work space 710 and a source repository 720 are used during development 705 phase of application. The work space 710 is used for creating files for an application, during development of a set of version of the application. The work space 710 may be part of a development environment providing different tools and infrastructure for managing and building application. Within the work scape 710, different operations over files associated with versions of applications may be performed. For example, operations such as editing, building, testing, etc. When such operations are performed, changes that are generated may be transferred to the source repository 720 via a commit operation. The source repository 720 may store source code associated with the application. The source code from the source repository 720 may be checked out and copied into the work space 710, where further changes may be applied. When an application version is selected for deployment, a built operations over files related to the application version may be performed. The results from a build operation may be stored in an object repository 730. The object repository may be such as the object repository 547, FIG. 5. The compiled files of the application version after the build are stored in the object repository 730 as archives and may be deployed on runtime 740. When the application version is deployed, further runtime authoring 750 activities may be generated during runtime. The runtime authoring 750 activities include editing and testing activities. Such runtime authoring 750 activities may result in generation of runtime authoring objects. The generated runtime authoring object during runtime of the application version may be exported back into the object repository 730.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
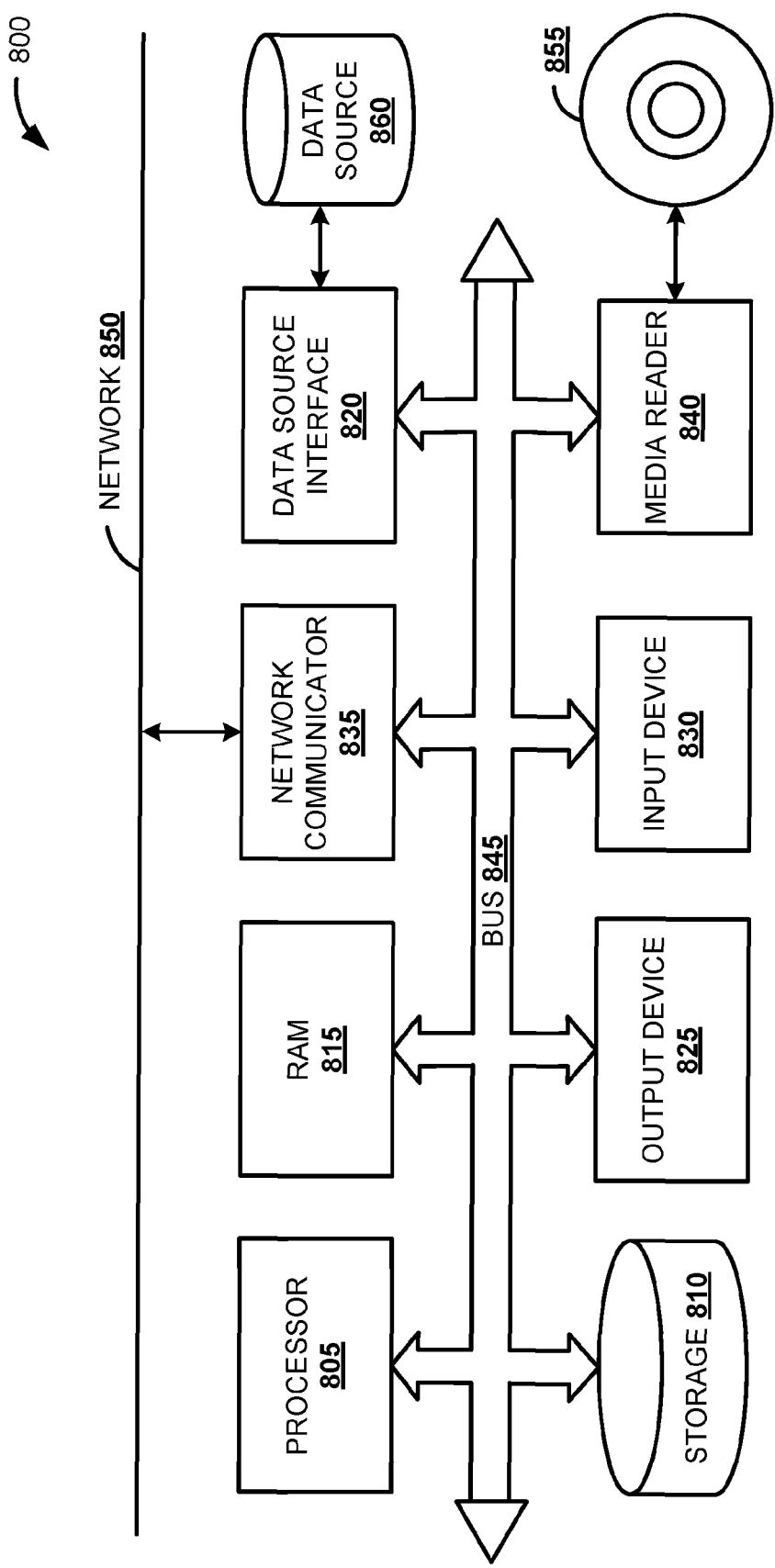
FIG. 8 is a block diagram illustrating an embodiment of a computing environment in which the techniques described for delivering customized applications in a customer system landscape via version control systems can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to deliver customizations of applications for deployment through a customer's version control system (VCS), the method comprising:
    populating a first branch from a set of branches in the customer's VCS with a second version of an application, wherein the first branch comprises files of a first version of the application;
    customizing the second version of the application in the first branch to generate an updated version of the application, wherein customizing is associated with existing configurations and runtime authoring objects generated for a deployed first version of the application;
    transporting the updated version of the application to a second branch from the set of branches through merging the first branch and the second branch, wherein the updated version comprises at least one modification to the files of the first version;
    in response to a request for deployment, providing a reference of the second branch for deployment of the updated version of the application on a runtime infrastructure of a corresponding system to the second branch, selected from a set of systems;
    deploying files of the updated version of the application on the runtime infrastructure of the corresponding system to the second branch through the provided reference, wherein deploying further comprises:
        fetching metadata included in the files of the updated version; and
        based on the fetched metadata, a deploy service, invoking the files of the updated version through a sub-reference from the second branch defined based on the provided reference to the second branch.

2. The method of claim 1, further comprising:
downloading the first version of the application from a vendor's VCS to the customer's VCS;
populating the first branch in the customer's VCS with the files comprised in the downloaded first version of the application; and
downloading the second version of the application from the vendor's VCS.

3. The method of claim 2, further comprising:
creating the set of branches in the customer's VCS to correspond to the set of systems defined for a customer change management landscape; and
establishing a connection between the customer's VCS and the vendor's VCS.

4. The method of claim 1, wherein the set of branches are defined based on an integration complexity of a customer system landscape defining one or more applications to be deployed in the set of systems defined for a customer change management landscape.

5. The method of claim 1, wherein customizing the second version of the application in the first branch comprises:
applying existing customizations and modification on the second version of the application to generate a third version of the application in the first branch; and
updating the third version of the application with the runtime authoring objects to generate the updated version of the application, wherein the runtime authoring objects are received from the deployed first version of the application in a corresponding system to the first branch.

6. The method of claim 5, further comprising:
synchronizing files of the updated version of the application in the second branch with a file system of the corresponding system to the second branch.

7. The method of claim 6, further comprising:
re-synchronizing the second branch with the file system of the corresponding system to the second branch through downloading the at least one customized file from the files of the updated version.

8. The method of claim 5, further comprising:
customizing at least one file from the files of the updated version of the application to generate a customized updated version of the application in the second branch.

9. A computer system for deliver customizations of applications for deployment through a customer's version control system (VCS), comprising:
a processor;
a memory in association with the processor storing instructions to:
populate to a first branch from a set of branches in the customer's VCS with a second version of an application, wherein the first branch comprises files of a first version of the application;
customize the second version of the application in the first branch to generate an updated version of the application, wherein customizing is associated with existing configurations and runtime authoring objects generated for a deployed first version of the application;
transport the updated version of the application to a second branch from the set of branches through merging the first branch and the second branch, wherein the updated version comprises at least one modification to the files of the first version;

in response to a request for deployment, provide a reference of the second branch for deployment of the updated version of the application on a runtime infrastructure of a corresponding system from a set of systems to the second branch, wherein the set of systems are defined for a customer change management landscape;
fetching metadata included in files of the updated version;
based on the fetched metadata, a deploy service, invoking the files of the updated version through a sub-reference to the second branch defined based on the provided reference to the second branch; and
deploy the files of the updated version of the application on the runtime infrastructure of the corresponding system to the second branch via the sub-reference.

10. The system of claim 9, further comprising instructions to:
download the first version of the application from a vendor's VCS to the customer's VCS;
populate the first branch in the customer's VCS with the files comprised in the downloaded first version of the application; and
download the second version of the application from the vendor's VCS.

11. The system of claim 10, further comprising instructions to:
create the set of branches in the customer's VCS to correspond to the set of systems defined for the customer change management landscape; and
establish a connection between the customer's VCS and the vendor's VCS.

12. The system of claim 9, wherein the instructions to customize the second version of the application in the first branch, further comprises instructions to:
apply existing customizations and modification on the second version of the application to generate a third version of the application in the first branch; and
update the third version of the application with the runtime authoring objects to generate the updated version of the application, wherein the runtime authoring objects are received from the deployed first version of the application in a corresponding system to the first branch from the customer change management landscape.

13. The system of claim 12, further comprising instructions to:
synchronize files of the updated version of the application in the second branch with a file system of the corresponding system to the second branch from the set of systems;
customize at least one file from the files of the updated version of the application to generate a customized updated version of the application in the second branch; and
re-synchronize the second branch with the file system of the corresponding system to the second branch through downloading the at least one customized file from the files of the updated version.

14. A non-transitory computer-readable medium storing instructions, which when executed cause a computer system to:
populate to a first branch from a set of branches in a customer's version control system (VCS) with a second version of an application, wherein the first branch comprises files of a first version of the application;

apply defined customizations and modification for the first version of the application on the second version of the application to generate a third version of the application in the first branch;

update the third version of the application with runtime authoring objects to generate an updated version of the application, wherein the runtime authoring objects are received from a deployed first version of the application in a corresponding system to the first branch from a customer change management landscape;

transport the updated version of the application to a second branch from the set of branches through merging the first branch and the second branch, wherein the updated version comprises at least one modification to the files of the first version;

in response to a request for deployment, provide a reference of the second branch for deployment of the updated version of the application on a runtime infrastructure of a corresponding system to the second branch, wherein the corresponding system is selected from a set of systems;

fetching metadata included in files of the updated version;

based on the fetched metadata, a deploy service, invoking the files of the updated version through a sub-reference to the second branch defined based on the provided reference to the second branch; and deploy the files of the updated version of the application on the runtime infrastructure of the corresponding system to the second branch via the sub-reference.

15. The computer-readable medium of claim 14, further storing instructions to:

download the first version of the application from a vendor's VCS to the customer's VCS;

populate the first branch in the customer's VCS with the files comprised in the downloaded first version of the application; and download the second version of the application from the vendor's VCS.

16. The computer-readable medium of claim 14, further storing instructions to:

synchronize files of the updated version of the application in the second branch with a file system of the corresponding system from the set of systems to the second branch, wherein the set of systems are defined in relation to a customer change management landscape;

customize at least one file from the files of the updated version of the application to generate a customized updated version of the application in the second branch; and re-synchronize the second branch with the file system of the corresponding system to the second branch through downloading the at least one customized file from the files of the updated version.

* * * * *